United States Patent
Lefevre (10) Patent No.: US 6,832,022 B1
(45) Date of Patent: Dec. 14, 2004

(54) RECTANGULAR RESPONSE OPTICAL FILTER FOR PARTITIONING A LIMITED SPECTRAL INTERVAL

(75) Inventor: Hervé Lefevre, Paris (FR)

(73) Assignee: Photonetics, Marley let Roi (FR)

(*) Notice: Subject to any disclaimer, the term of this patent is extended or adjusted under 35 U.S.C. 154(b) by 249 days.

(21) Appl. No.: 10/030,083

(22) PCT Filed: Jul. 12, 2000

(86) PCT No.: PCT/FR00/02018
§ 371 (c)(1),
(2), (4) Date: Jul. 11, 2002

(87) PCT Pub. No.: WO01/05006
PCT Pub. Date: Jan. 18, 2001

(30) Foreign Application Priority Data

Jul. 12, 1999 (FR) .............................. 99 09024

(51) Int. Cl.⁷ ................................................ G02B 6/32
(52) U.S. Cl. ..................... 385/33; 359/558; 359/566
(58) Field of Search ...................... 385/10, 33; 359/558, 359/566, 568, 569

(56) References Cited

U.S. PATENT DOCUMENTS

| | | | | |
|---|---|---|---|---|
| 5,594,744 A | * | 1/1997 | Lefevre et al. | 372/20 |
| 6,249,364 B1 | * | 6/2001 | Martin et al. | 398/9 |
| 6,330,090 B1 | * | 12/2001 | Martin et al. | 398/9 |
| 6,507,597 B1 | * | 1/2003 | Graindorge et al. | 372/102 |
| 6,529,327 B1 | * | 3/2003 | Graindorge | 359/566 |

* cited by examiner

Primary Examiner—Phan T. H. Palmer
Assistant Examiner—Jennifer Doan
(74) Attorney, Agent, or Firm—Arent Fox (57) ABSTRACT

The invention concerns a rectangular response optical filter for partitioning a limited spectral interval in a light flux with large spectrum comprising: a preferably monomode input optical fiber having one end; an array-reflector assembly in Litmann-Metcalf configuration; a converging optical system collimating at whose focus is set the input fiber end; a converging focusing optical system set between the array and the reflector; one or several output fibers of the same type as the input fiber. At least one reflector is placed in the focal plane of the focusing optical system and has a limited dimension in the dispersion plane, the position and the limited dimension of the dispersion plane determining the partitioned spectral interval.

19 Claims, 8 Drawing Sheets

FIGURE 3B
ART ANTERIEUR

RECTANGULAR RESPONSE OPTICAL FILTER FOR PARTITIONING A LIMITED SPECTRAL INTERVAL

This invention concerns a rectangular response optical filter for partitioning a limited spectral interval and having optical fibres, preferably single mode fibres, as input and output gates.

The evolution of wavelength multiplexed optical fibre telecommunications requires the development and the optimisation of such devices. It has been sought in particular to partition a wide spectrum into spectral domains, here called limited spectral intervals, while avoiding any superimpositions and cross-talk that might derive therefrom.

Numerous devices have already been proposed to that effect, whereas most of them consist in spreading the luminous spectrum in a plane and in placing in the said plane, a slot delineating the narrow spectral band that one wishes to select, but then the light cannot be recoupled efficiently in a monomode optical fibre.

Other devices implement sets of optically guided components: couplers, multiplexers-demultiplexers, . . .

Figure 1:
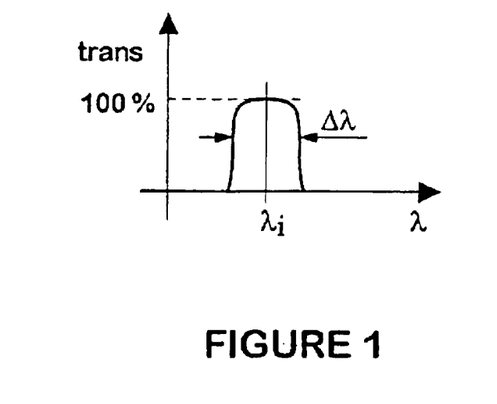
FIG. 1 represents a spectrum partitioned by the device of the invention.

The optimisation of such devices implies the provision of rectangular transmission functions and without loss in the limited spectral interval light flux selected, i.e. in a representation of the intensity of the light flux transmitted as a function of the wavelength as that on FIG. 1, the edges of the partitioned band should be as vertical as possible, the apex should be as flat as possible and the losses as little as possible. The apex can be flattened according to the state-of-the-art by generating losses.

We also know a document (I. Nishi and al., December 1987) that divulges a wide-band multiplexer-demultiplexer for multimode filter. It suggests the implementation of a retrodispersing system in Littrow configuration with respect to an input fibre and to output fibres. This document specifies that the width of the pass-band of such a device is determined by the length of the retroreflector.

Besides, in a published article (Chi-Luen Wang and al., 1994), is described an external cavity laser wherein the external cavity is set up so that it enables filtering of two wavelengths. Filtering is performed by reflecting bands forming reflecting mirrors cooperating with a grating.

The implementation of the teachings of these documents does not enable to realise a transmission-stable device and ensuring good accuracy.

The inventors have set themselves the target of providing such a device implementing a grating-reflector assembly in Littman-Metcalf configuration in order to take advantage of the high performances offered by such a type of configuration and that such a device does not generate any losses and possesses optical fibres, preferably monomode as input and output gates, ensuring optimized stability and accuracy.

Thus, the invention concerns a rectangular response optical filter for patitioning a limited spectral interval in a wide spectrum light flux comprising:

an input optical fibre having one end,
a grating-reflector assembly in Littman-Metcalf configuration,
a converging collimation optical system at whose focal point is located the end of the input fibre,
a converging focusing optical system placed between the grating and the reflector,
at least one reflector placed in the focal plane of the focusing optical system whose dimension is limited in the dispersion plane, whereas the position and limited dimension of the reflector in the dispersion plane determine the partitioned spectral interval.

According to the invention, the optical filter comprises a polarisation separator placed between the input fibre and the grating and generating two elementary light beams parallel and polarised orthogonally with respect to one another, whereas a plate $\lambda/2$ is placed on one of the elementary beams in order to generate two elementary parallel beams polarised in a direction perpendicular to the lines of the grating, whereas the reflector of Littman-Metcalf configuration is sending each elementary beam back to path and in opposite direction in relation to one another.

In different embodiments each exhibiting its own specific advantages and liable to be used in the compatible technically combinations:

the input optical fibre is a monomode fibre,
the light flux generated with limited spectrum is collected in an output optical fibre distinct from the input fibre and of the same type as the latter,
the optical filter comprises several optical output fibres, each connected to a reflector, whereas these reflectors are positioned in the focal plane of the focusing optical system and have a small dimension in the dispersion plane while determining a particular spectral interval,
the light flux generated with limited spectrum is collected by the input fibre and the latter carries an optical circulator enabling to separate the output flux from the incoming flux without any energy loss,
the optical filter comprises a folding reflector doubling the number of passages of the light beam on the grating,
the reflector of Littman-Metcalf configuration is a planar mirror connected to a bi-prism,
the reflector of Littman-Metcalf configuration is a truncated dihedron.

The invention will be described in more detail with reference to the appended drawings wherein.

FIG. 1 is therefore a diagram representing the energy of the light flux coming from the partitioning device of the invention, as a function of wavelength $\lambda$. The incoming spectrum extends supposedly over a long range, in wavelength, on the basis of the scale of this extended diagram and the device of the invention enables to partition a narrow band represented by a function as close as possible to a rectangular function, with width $\Delta\lambda$ centred on a wavelength $\lambda_i$.

The device of the invention comprises therefore an input fibre 1 having one end 2. The partitioning device of the invention as a whole is designated by the reference 3. This device comprises a grating 4-reflector 5 assembly in Littman-Metcalf configuration.

Figure 3A:
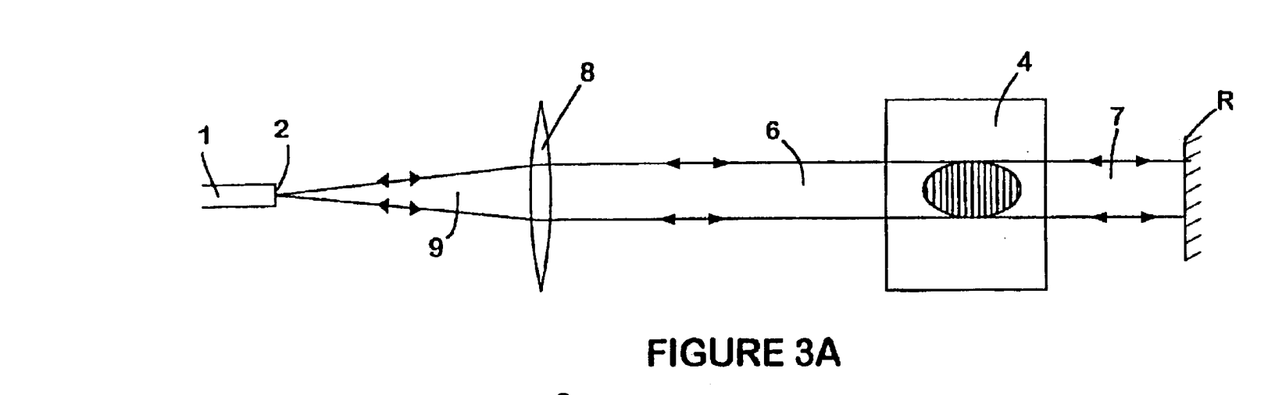
FIGS. 3A and 3B represent a Littman-Metcalf configuration used conventionally.
Figure 3B:
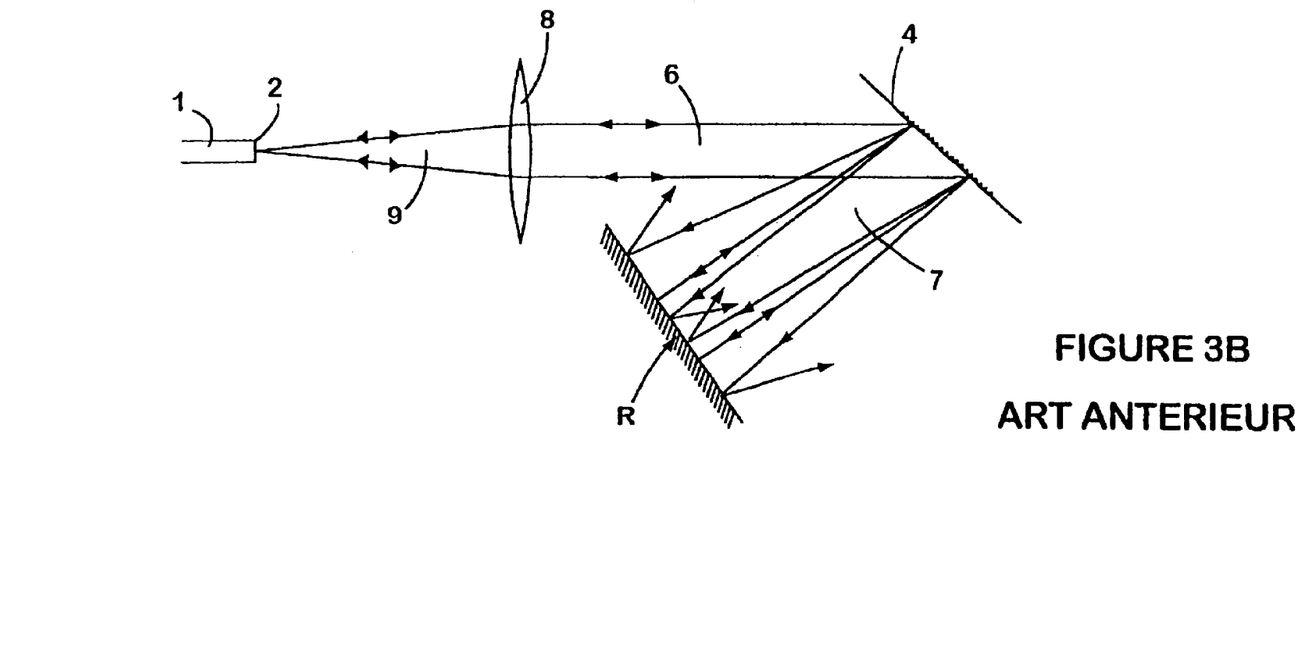

We know that in the conventional Littman-Metcaif configuration, represented on FIGS. 3A and 3B, the incident collimated beam describes an angle $\theta_1$ with respect to the normal to the grating. A reflector R is placed with its normal having an angle $\theta_2$ to the grating. The wavelength $\lambda$ that complies with the condition $\lambda = p(\sin \theta_1 + \sin \theta_2)$ where p is the pitch of the grating, is dispersed by the grating at an angle $\theta_2$ then retroreflected by the reflector that is then perpendicular to the latter. Finally, it is dispersed again in the grating on the way back and comes out under the input angle $\theta_1$. The wavelength $\lambda$ is therefore selected by the cavity. That wavelength $\lambda$ can be varied while changing the orientation of the grating-reflector assembly, i.e. while changing $\theta_1$ or while changing solely the orientation of the reflector, i.e. while changing $\theta_2$ or finally while changing solely the orientation of the grating, i.e. while changing $\theta_1$ and $\theta_2$ while keeping $\theta_1-\theta_2$ constant.

In the description of such devices, it is customary to call dispersion plane the plane perpendicular to the lines of the grating containing the central ray of the incident beam and the central rays of the beams dispersed by the grating, it is shown on FIG. 3B.

For each beam, transversal plane shall designate the plane perpendicular to the central ray and longitudinal plane shall designate the plane perpendicular to the dispersion plane containing the central ray. The longitudinal plane is therefore that on FIG. 3A.

On the various appended figures, view A is an unfolded view, i.e. wherein the beam dispersed 7 by the grating 4 has been represented in the direct extension of the incident beam 6 for better readability. View B is a representation from beneath, i.e. in a plane parallel to the dispersion plane.

Figure 4A:
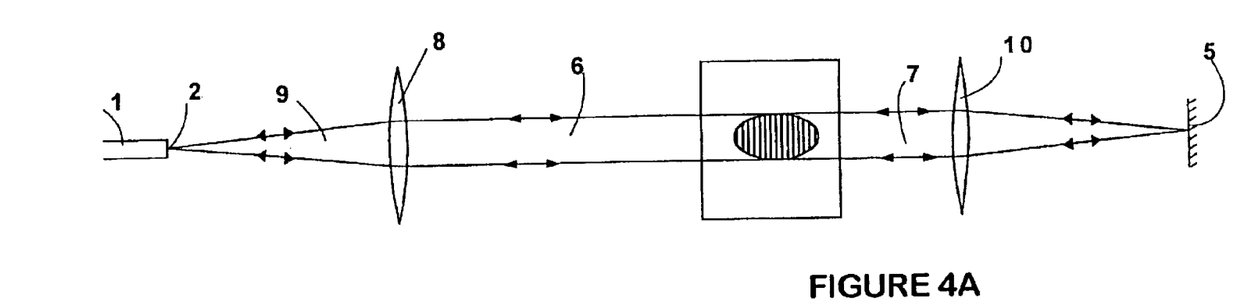
FIGS. 4A and 4B represent a first embodiment of the invention.
Figure 4B:
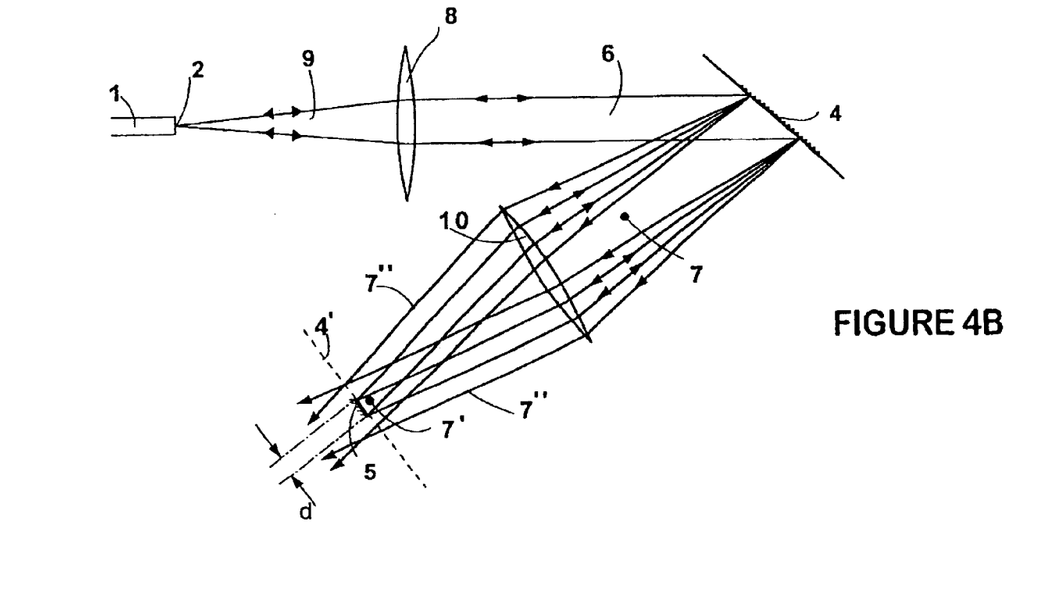

FIG. 4 with its views A and B shows a system wherein the selection in wavelength is conducted by the geometrical dimensions of a mirror connected to a grating in Littman-Metcalf configuration. A converging optical system 8 at whose focal point is placed the end 2 of the input fibre 1, collimates the beam 9 emitted from the end of the fibre, so that the incident beam 6 on the grating is a collimated b am. Thus, th dispersed beam(s) 7 are also collimated b ams and a converging optical system 10 focuses these beams in its focal plane 4' wherein is placed a mirror 5 which has a limited dimension d in the dispersion 7' plane as shown on FIG. 4B. For the wavelengths corresponding to the beams reflected on the mirror, the system behaves like a cat's eye, and hence these wavelengths are re-coupled on the way back in the input fibre, regardless whether it is monomode or multimode.

Thus, this mirror only reflects towards the optical system 10 and hence towards the grating 4, a limited portion of the spectrum, whereas the wavelengths corresponding to the external beams 7'' are not reflected.

This flux is partitioned and coupled on the way back by the optical system 8 then by the optical fibre 1 which therefore in that embodiment, acts as an input and output optical fibre.

Figure 2:
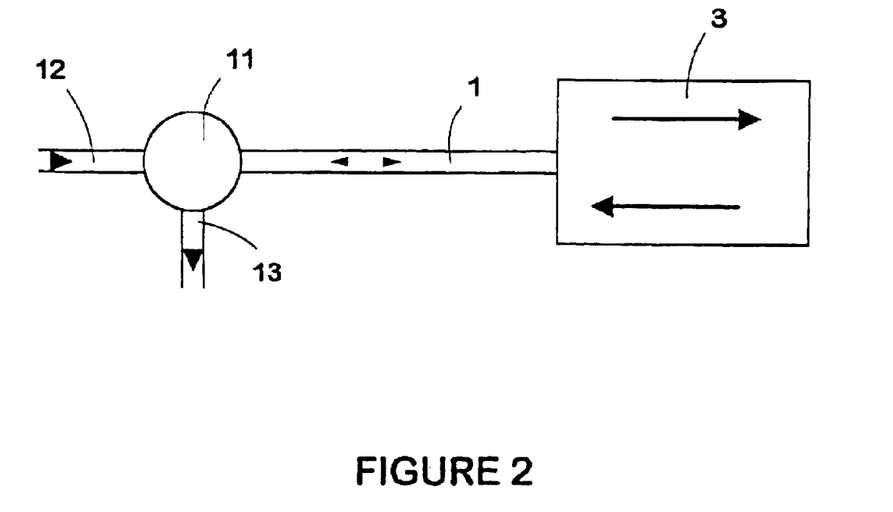
FIG. 2 represents a device of the invention implemented with a circulator.

Different devices can be considered to separate the input fluxes and the is output fluxes so that, in particular, preferably, FIG. 2 shows a circulator that enables to realise such separation with minimal energy losses.

The input-output fibre 1 connected to the partitioning device 3 is therefore connected to its other end to the circulator 11 which possesses an input 12 and an output 13.

This wavelength selection device operates correctly, but is still proving unstable and is providing inaccurate light fluxes or signals.

To remedy these shortcomings, we have endeavoured, according to the invention, to break free from the polarisation defects.

Figure 5A:
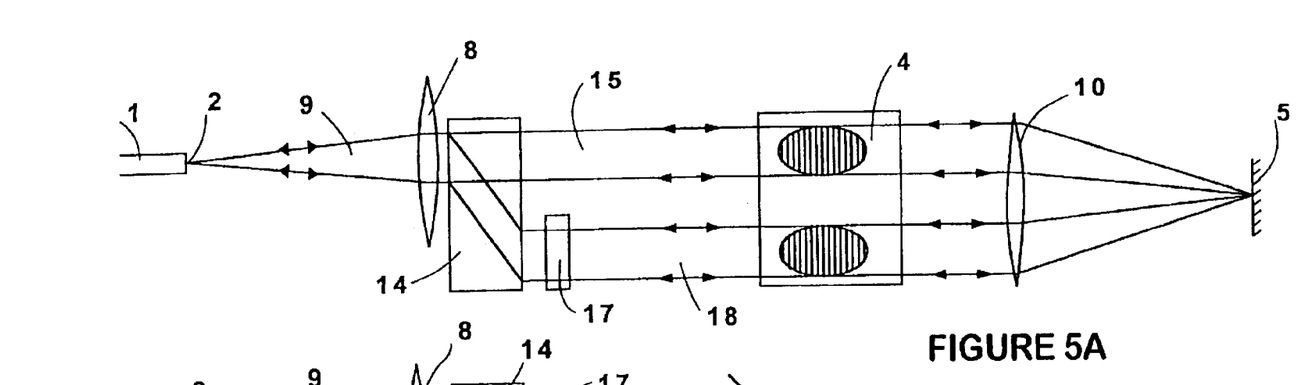
FIGS. 5A and 5B represent a first embodiment of the invention, with compensation of the polarisation effects due to the grating.
Figure 5B:
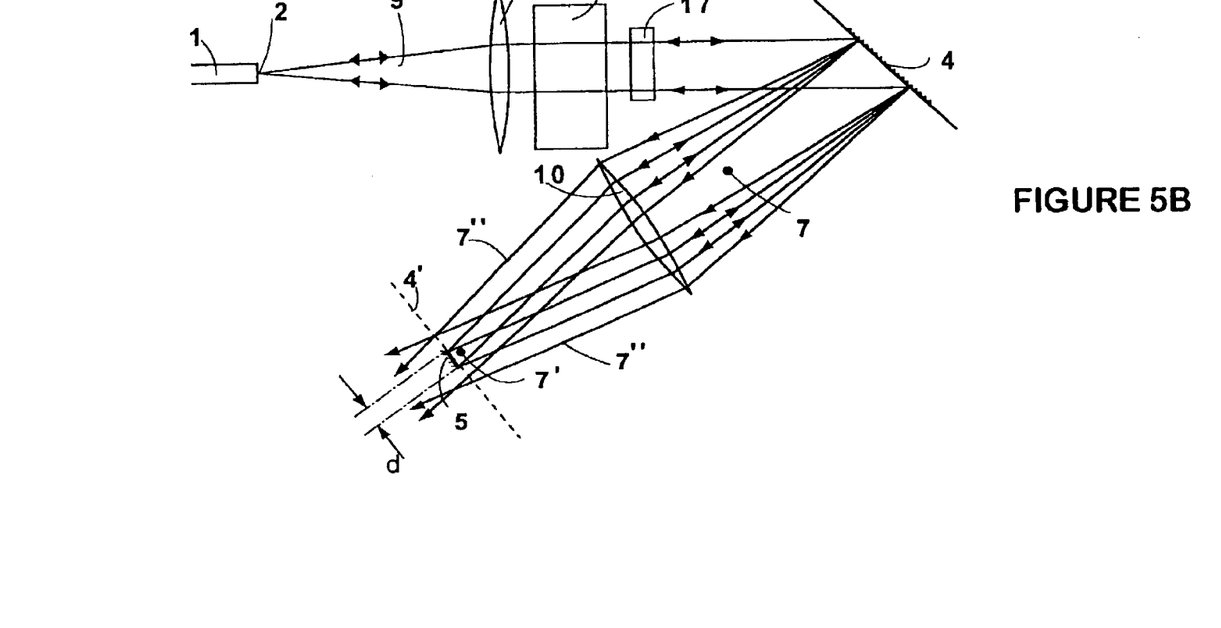

Thus, as represented on FIGS. 5A and 5B, we have implemented a device compensating for the known polarisation effects liable to be induced by the grating 4 and to generate spurious effects.

To that effect, the collimated beam 6 emerging from the optical system 8 is divided by the polarisation separator 14 into two parallel beams, respectively 15 and 16, with cross polarisation. A plate $\lambda/2$ 17 modifies the flux polarisation 16, so that the flux 15 and the modified flux 18 are polarised in a similar fashion and undergo therefore exactly the same effects from the grating 4. The lens 10 causes each of these beams to converge onto the mirror 5 which exchanges their paths, which means that the return paths of the beams 18 and 15 are exchanged after reflection onto the mirror 5, whereas the beam 18 follows the optical path of th beam 15 on its way out and vice-versa.

Thus, the b ams 18 and 15 are recombined on the way back and have undergone exactly the same effects of the grating 4.

Thus, any spurious effect liable to be generated by the grating in relation to the polarisation and the shape of the spectral distribution of the partitioned light flux is therefore improved Different preferred embodiments enable the implementation of the device described above and each of them enhances the thinness of the partitioned spectral band and possibly, in order to partition a greater number of elementary bands in the incident wide spectrum.

Figures 6A, 6B:
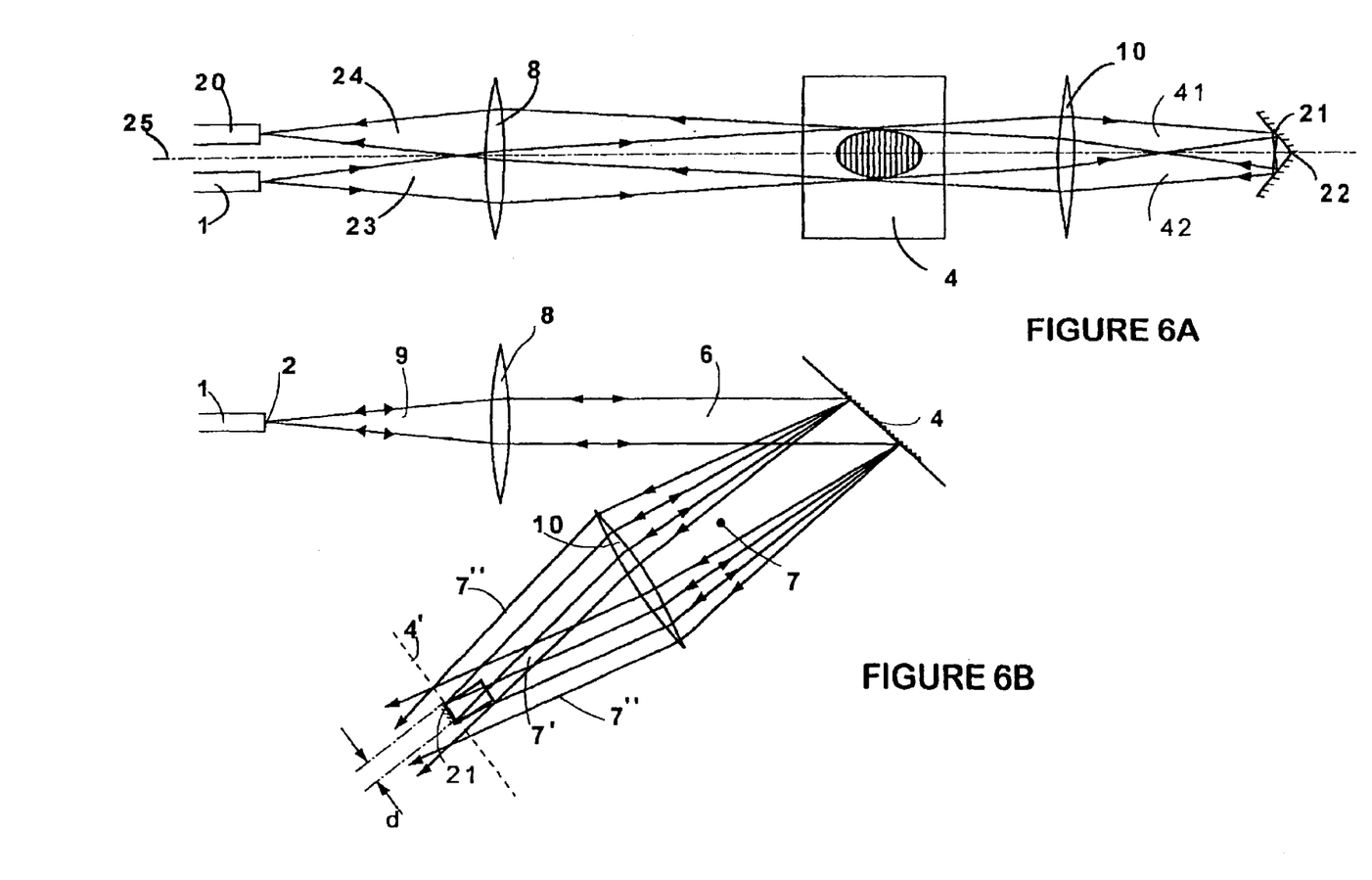
FIGS. 6A and 6B represent a second embodiment of the invention implementing an output fibre distinct from the input fibre.

FIGS. 6A and 6B represent an embodiment wherein the output fibre 20 is distinct from the input fibre 1.

To that effect, the mirror 5 is replaced with a reflector 21 which, seen in the longitudinal plane, has the shape of a dihedron whereas it keeps a small dimension d in the dispersion plane.

As represented in the longitudinal plane, this dihedron 21 is positioned with respect to the converging optical system 10 so that after reflection onto each of the faces of the dihedron 21, the parallel incoming beams in the optical system 10 converge into a beam 41 in the middle plane 22 of the dihedron 21 and emerge in the shape of a symmetrical beam 42, enabling as well as the beam 23 transmitted by the fibre 1, forming a beam 24 which is symmetrical to the beam 23 with respect to the optical axis 25 of the system and is received by the fibre 20 set symmetrically with respect to that axis of the input fibre 1.

Figure 7:
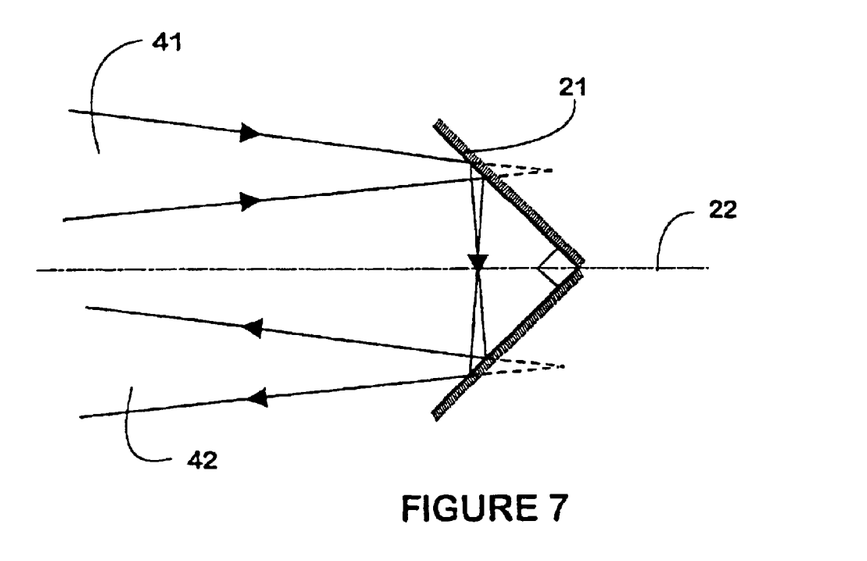
FIG. 7 is a detailed view of a reflector implemented in the second embodiment.
Figure 8:
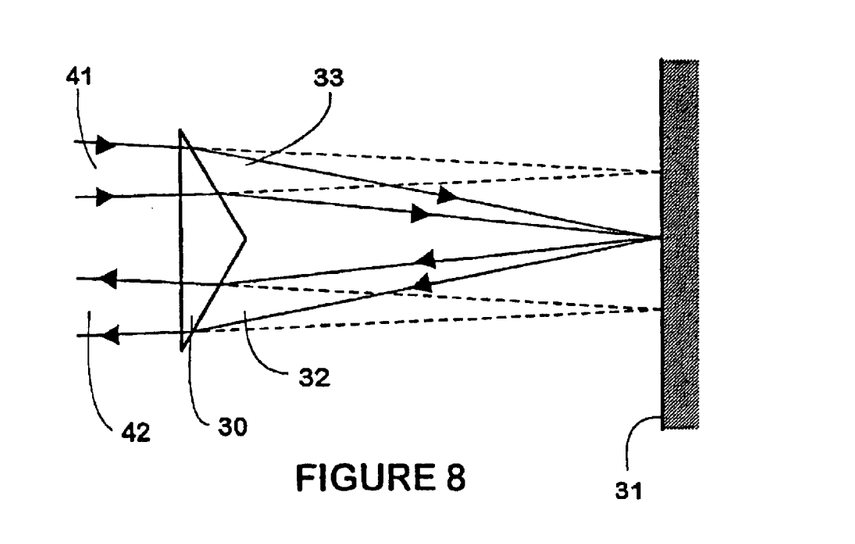
FIG. 8 is a detailed view of an alternative reflector type that can be implemented in the second embodiment.

Such a dihedron is represented more in detail on FIG. 7 and this component can be replaced in a similar fashion by the assembly represented on FIG. 8 consisting of a biprism 30 and a mirror 31. As the mirror 31 is perpendicular to the axis of symmetry of the biprism 30, an incoming beam 41 generating the beam 33 by the deviation of the biprism 30 is converging in the plane of the mirror 31 and reflected symmetrically. The mirror 31 generating a beam 32 which, after deviation by the biprism 30, produces a beam 42. The beam 42 is symmetrical to the beam 41 This component 30, 31 therefore enables, as the reflector 21, the realisation of a beam 35 to be received by the fibre 20 from the beam 23 transmitted by the fibre 1.

Figure 9A:
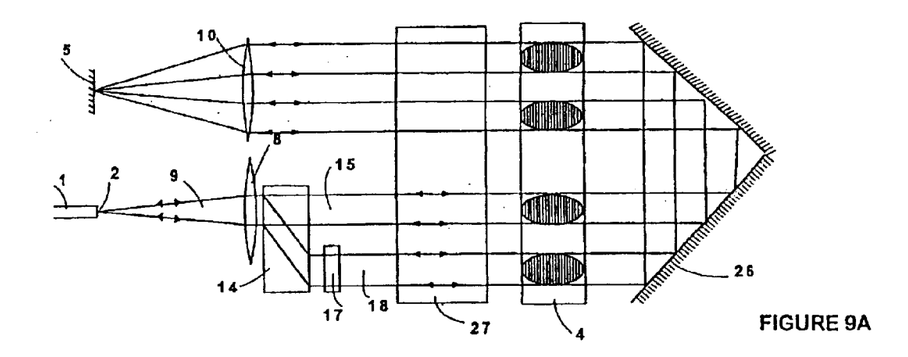
FIGS. 9A, 9B and 9C represent a fourth embodiment of the invention.
Figure 9B:
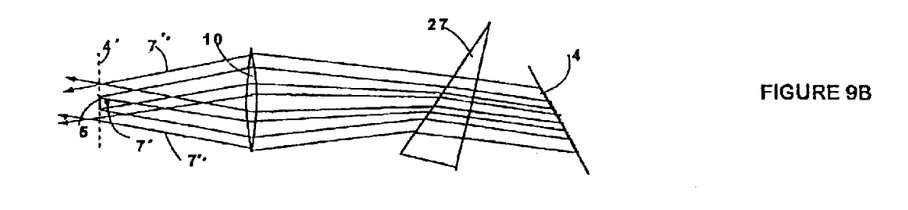
Figure 9C:
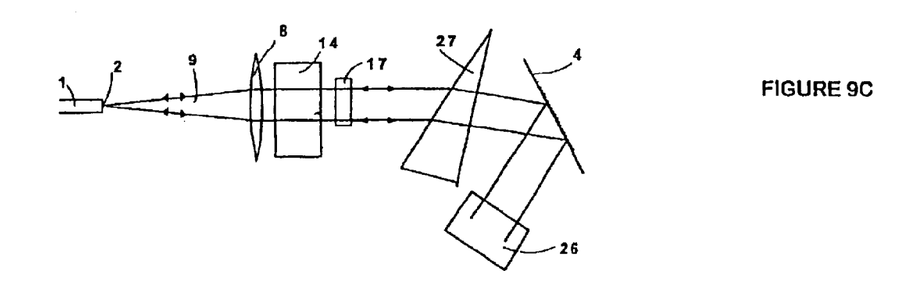

FIGS. 9 (9A, 9B, 9C) represent an embodiment of the invention enabling simultaneously to compensate for the biasing effects as stated above, to lin arise the distribution of the spectrum, in frequency, in the partitioning zone and to compensate for the anamorphosis normally induced by the grating.

To that ffect, a polarisation separator is placed after the conv rging optical system 8 and breaks down the incident light beam 9 generated by the input optical fibre 1 into two beams 15 and 18. A prism 27 is then placed on the beams and realises a first dispersion before that produced by the grating 4.

We know that it is thus possible to generate, thanks to the association of the prism 27 and of the grating 4, a frequency-linear dispersion.

The light beams are then folded back onto themselves by a reflector 26 which therefore sends them back, in reverse direction, onto the dispersing assembly formed by the grating 4 and the prism 27.

For better readability, FIG. 9 shows independently, on view A, a transversal representation of the device as the views A of FIGS. 3, 4, 5, 6, on view B, a view in the dispersion plane corresponding to the upper stage of view A and, on view C, a view of this same dispersion plane of the lower stage of view A.

At the upper stage, after new dispersion by the grating 4-prism 27 assembly, the optical collimating system 10 focuses these beams onto the mirror 5 which proceeds to the requested spectral selection.

The beams selected are then reflected and follow a path reverse from that described until now to converge on the way back onto the end 2 of the fibre 1.

Thus, the polarisation separation enables symmetrical action of the grating during each of these passages and avoids therefore any spurious effect, the association of a prism and of a grating enables frequency linearization in the spreading plane of the spectrum, i.e. in the plane of the mirror 5, the double passage of each of the beams through the dispersing assembly (grating-prism) ensures compensation for the anamorphosis and hence efficient coupling of the beam outgoing in the fibre 1. This fourth embodiment can be used in combination with the third embodiment while replacing the single fibre by an input fibre and one or several output fibres and while replacing the mirror by one or several reflecting dihedral or mirror-biprism assemblies.

It may also be useful to associate each fibre with a microlens in order to reduce the divergence of the beam 9.

Finally, this filter may be tuneable while modifying the position or the width d of the reflector, or while placing in rotation the grating or the collimation optical system—reflector assembly—or finally the folding reflector 26. Connected to a detector, this filter enables to realise an analyser for rectangular spectral response optical spectrum.

Figure 10:
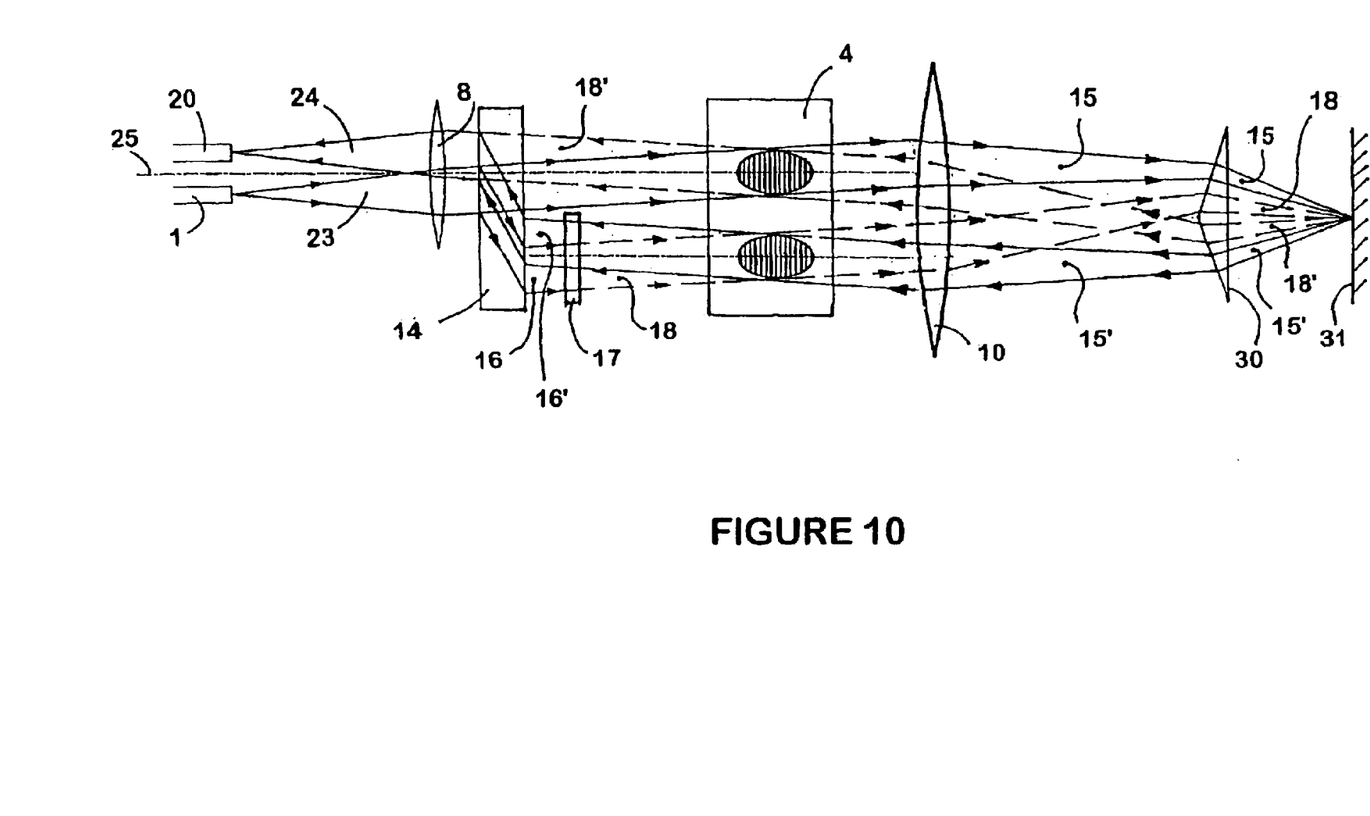
FIG. 10 is an embodiment of the invention implementing an alternative reflector in the first embodiment of the invention.

FIG. 10 represents an embodiment of the invention wherein the output fibre is distinct from the input fibre and wherein a reflector as that represented and described by reference to FIG. 8, is used.

The elements represented on the previous Figures have been designated by the same numerical references, as on FIGS. 6A and 6B, the beam 23 transmitted by the fibre 1 forms a beam 24 symmetrical to the beam 23 with respect to the optical axis 25 of the system.

The polarisation separator 14 splits the incoming beam 23 into two parallel beams, respectively 15 and 16. After reflection onto the mirror 31 and having been deviated by the biprism 30 before reflection as well as after reflection, both these beams pass again through the assembly formed by the plate λ/2 17 and the polarisation separator 14 in order to form the return beam 24 that is coupled to the optical fibre 20. Solely the reflected beam 15' from the beam 15 is subject to the plate λ/2 17. Conversely, the reflected beam 18' from the incident beam 18 is sent to the polarisation separator 14 without being subject to the effect of that plate λ/2. The beams 18' and 16' (generated from the beam 15' by the effect of the plate λ/2 17) are combined by the bias separator 14 to form the beam 24.

This device has been described with a mirror whose sizes and position are fixed.

In certain applications, it may be useful to vary the spectral width of the selected flux and/or its central wavelength. In order to control the spectral width, a slit with variable width is placed before a large mirror. The position of the slit in its plane determines the central wavelength.

What is claimed is:

1. A rectangular response optical filter for partitioning a limited spectral interval in a light flux with wide spectrum comprising:

an input optical fibre having one end, a grating-reflector assembly in Littman-Metcalf configuration, a converging collimation optical system at whose focal point is located the end of the input fibre, a converging focusing optical system placed between the grating and the reflector, at least one reflector placed in the focal plane of the focusing optical system which has a dimension limited in the dispersion plane whereas the position and the limited dimension of the reflector in the dispersion plane determine the partitioned spectral interval, characterized in that it comprises a polarisation separator placed between the input fibre and the grating and generating two elementary light beams parallel and polarised orthogonally with respect to one another, whereas a plate λ/2 is placed on one of the elementary beams in order to generate two elementary parallel beams polarised in a direction perpendicular to the lines of the grating, whereas the reflector of Littman-Metcalf configuration sends back each elementary beam onto the path and in opposite direction in relation to one another.

2. An optical filter according to claim 1, characterised in that the input optical fibre is a monomode fibre.

3. An optical filter according to one of the claims 1 and 2, characterised in that the light flux generated with limited spectrum is collected in an output optical fibre distinct from the input fibre and of the same type as the latter.

4. An optical filter according to claim 3, characterized in that it comprises several optical output fibres, each of them being connected to a reflector, these reflectors being positioned in the focal plane of the focusing optical system and having a small dimension in the dispersion plane and determining a particular spectral interval.

5. An optical filter according to claim 4, characterized in that it comprises a folding reflector doubling the number of passages of the light beam on the grating.

6. An optical filter according to claim 4, characterised in that the reflector of Littman-Metcalf configuration is a planar mirror connected to a bi-prism.

7. An optical filter according to claim 4, characterized in that the reflector of Littman-Metcalf configuration is a truncated dihedron.

8. An optical filter according to claim 3, characterized in that it comprises a folding reflector doubling the number of passages of the light beam on the grating.

9. An optical filter according to claim 3, characterized in that the reflector of Littman-Metcalf configuration is a planar mirror connected to a bi-prism.

10. An optical filter according to claim 3, characterized in that the reflector of Littman-Metcalf configuration is a truncated dihedron.

11. An optical filter according to one of the claims 1 and 2, characterised in that the light flux generated with limited spectrum is collected by the input fibre and in that said fibre carries an optical circulator enabling to separate the output flux from the incoming flux without any energy loss.

12. An optical filter according to claim 11, characterized in that it comprises a folding reflector doubling the number of passages of the light beam on the grating.

13. An optical filter according to claim 11, characterized in that the reflector of Littman-Metcalf configuration is a planar mirror connected to a bi-prism.

14. An optical filter according to claim 11, characterized in that the reflector of Littman-Metcalf configuration is a truncated dihedron.

15. An optical filter according to one of the claims 1 or 2, characterized in that it comprises a folding reflector doubling the number of passages of the light beam on the grating.

16. An optical filter according to claim 15, characterized in that the reflector of Littman-Metcalf configuration is a planar mirror connected to a bi-prism.

17. An optical filter according to claim 15, characterized in that the reflector of Littman-Metcalf configuration is a truncated dihedron.

18. An optical filter according to one of the claims 1 or 2, characterized in that the reflector of Littman-Metcalf configuration is a planar mirror connector to a bi-prism.

19. An optical filter according to one of the claims 1 or 2, characterized in that the reflector of Littman-Metcalf configuration is a truncated dihedron.

* * * * *